US012699583B2

(12) United States Patent
Gangar et al.

(10) Patent No.: US 12,699,583 B2
(45) Date of Patent: Aug. 4, 2026

(54) EFFICIENT DOWNSCALING AND UPDATING OF COMPUTING CLUSTERS

(71) Applicant: Rubrik, Inc., Palo Alto, CA (US)

(72) Inventors: Mihir Gangar, Milpitas, CA (US); Uday Soni, Atlanta, GA (US); Veera Venkata Naga Rama Satyam Kandula, Cupertino, CA (US); Sriram Lakkaraju, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 428 days.

(21) Appl. No.: 18/206,798

(22) Filed: Jun. 7, 2023

(65) Prior Publication Data

US 2024/0411574 A1    Dec. 12, 2024

(51) Int. Cl.
G06F 9/455 (2018.01)
G06F 8/65 (2018.01)

(52) U.S. Cl.
CPC ............ G06F 9/45558 (2013.01); G06F 8/65 (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2021/0067607 A1* | 3/2021 | Gardner | H04L 41/082 |
| 2021/0072966 A1* | 3/2021 | Zong | H04L 67/60 |
| 2022/0350509 A1* | 11/2022 | Verma | G06F 3/0617 |
| 2024/0160428 A1* | 5/2024 | Thakare | G06F 9/5077 |
| 2024/0289111 A1* | 8/2024 | Kaveri Poompatnam Chandrasekaran | G06F 9/455 |

* cited by examiner

*Primary Examiner* — Wynuel S Aquino
(74) *Attorney, Agent, or Firm* — Holland & Hart LLP

(57) ABSTRACT

Methods, systems, and devices for data management are described. A data management system may include computing nodes that host respective sets of computing pods. The data management system may identify that some computing nodes each satisfy a resource usage threshold, and may cordon some of the identified computing nodes such that no new pods may be added to the cordoned computing nodes. The system may then perform a software update for the cordoned nodes and the non-cordoned nodes, which may result in replacing a first set of pods (previously on the cordoned nodes) with an updated first set of pods on the set of non-cordoned nodes and replacing a second set of pods (previously on the non-cordoned nods) with an updated set of second pods on the set of non-cordoned nodes. The system may then eliminate the empty set of cordoned nodes based on the update.

19 Claims, 9 Drawing Sheets

1   Pre-Upgrade Process

2   Cordoning Process

3   Update Process

4   Post-Update Process

200

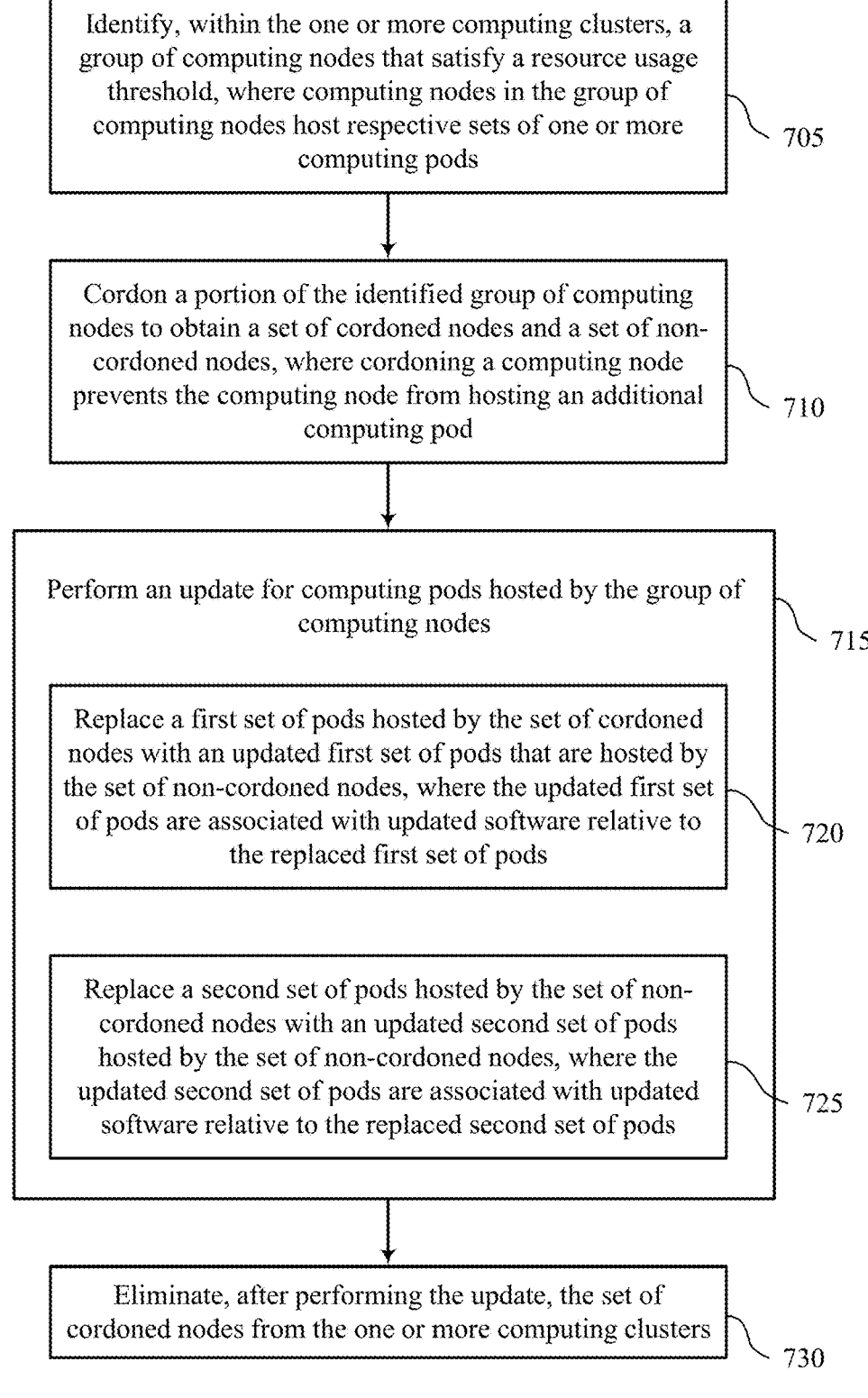

Identify, within the one or more computing clusters, a group of computing nodes that satisfy a resource usage threshold, where computing nodes in the group of computing nodes host respective sets of one or more computing pods

705

Cordon a portion of the identified group of computing nodes to obtain a set of cordoned nodes and a set of non-cordoned nodes, where cordoning a computing node prevents the computing node from hosting an additional computing pod

710

Perform an update for computing pods hosted by the group of computing nodes

715

Replace a first set of pods hosted by the set of cordoned nodes with an updated first set of pods that are hosted by the set of non-cordoned nodes, where the updated first set of pods are associated with updated software relative to the replaced first set of pods

720

Replace a second set of pods hosted by the set of non-cordoned nodes with an updated second set of pods hosted by the set of non-cordoned nodes, where the updated second set of pods are associated with updated software relative to the replaced second set of pods

725

Eliminate, after performing the update, the set of cordoned nodes from the one or more computing clusters

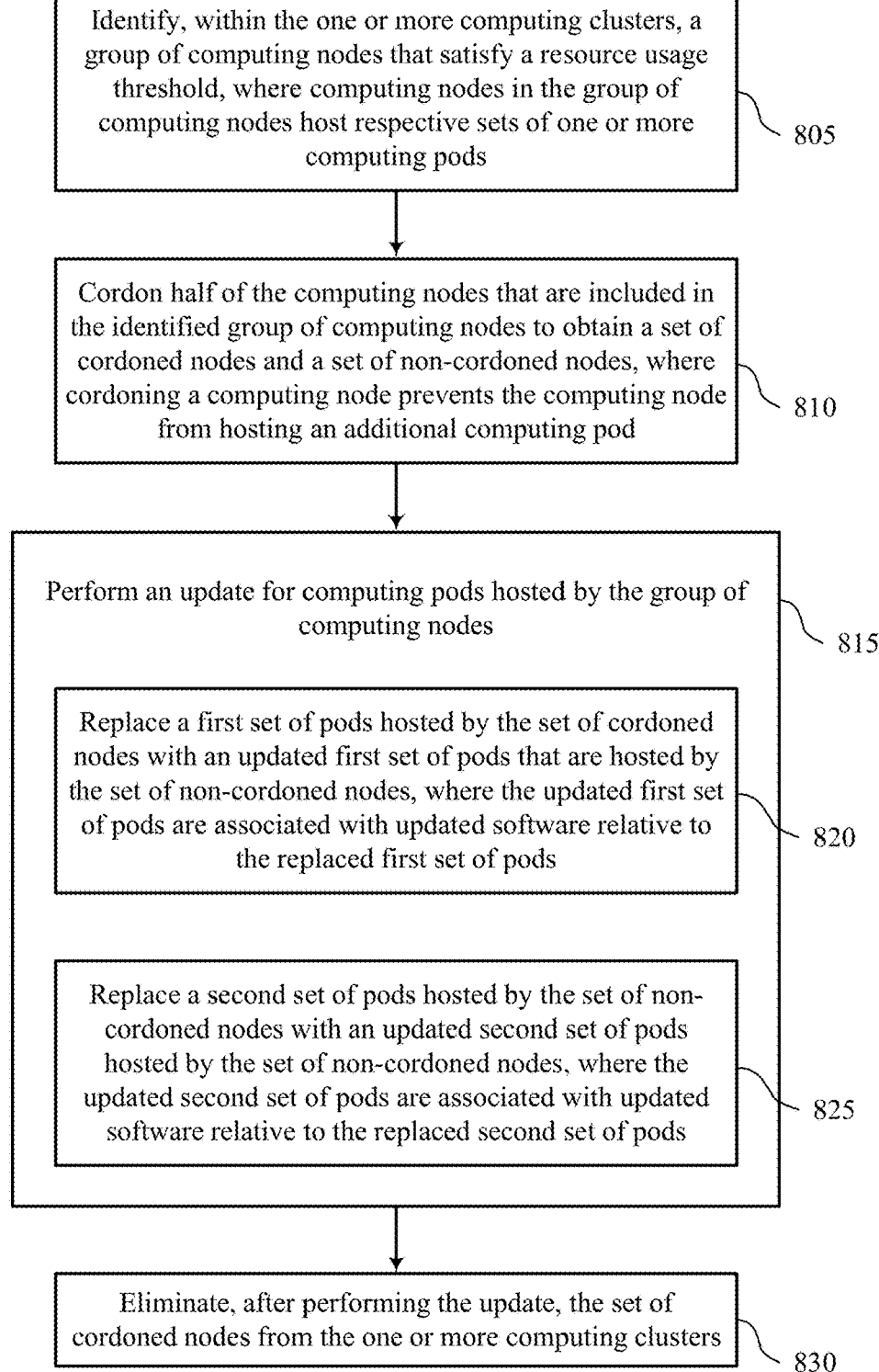

Identify, within the one or more computing clusters, a group of computing nodes that satisfy a resource usage threshold, where computing nodes in the group of computing nodes host respective sets of one or more computing pods ⟍ 805

Cordon half of the computing nodes that are included in the identified group of computing nodes to obtain a set of cordoned nodes and a set of non-cordoned nodes, where cordoning a computing node prevents the computing node from hosting an additional computing pod ⟍ 810

Perform an update for computing pods hosted by the group of computing nodes ⟍ 815

Replace a first set of pods hosted by the set of cordoned nodes with an updated first set of pods that are hosted by the set of non-cordoned nodes, where the updated first set of pods are associated with updated software relative to the replaced first set of pods ⟍ 820

Replace a second set of pods hosted by the set of non-cordoned nodes with an updated second set of pods hosted by the set of non-cordoned nodes, where the updated second set of pods are associated with updated software relative to the replaced second set of pods ⟍ 825

Eliminate, after performing the update, the set of cordoned nodes from the one or more computing clusters ⟍ 830

FIG. 8                    ⟍ 800

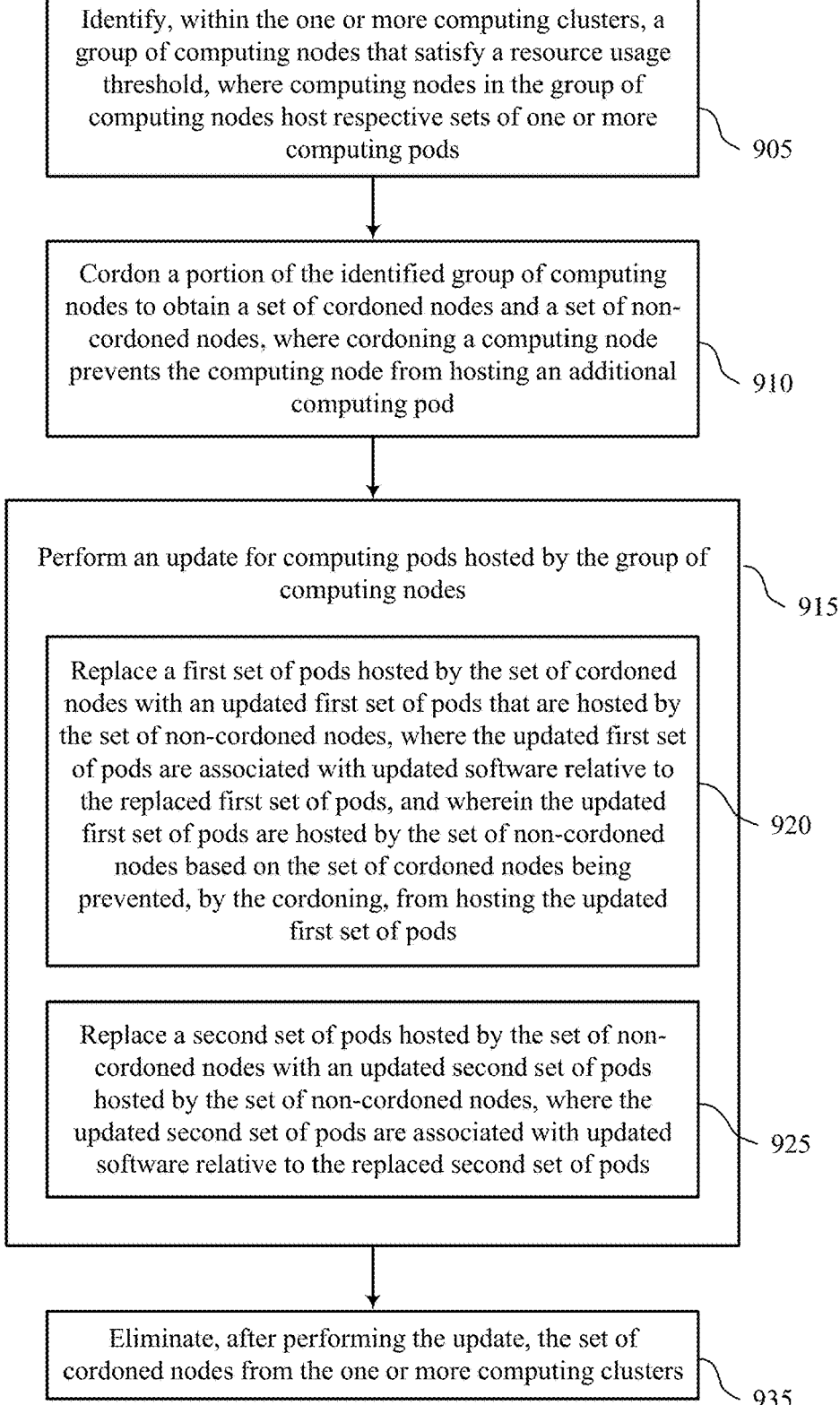

Identify, within the one or more computing clusters, a group of computing nodes that satisfy a resource usage threshold, where computing nodes in the group of computing nodes host respective sets of one or more computing pods ⟍ 905

Cordon a portion of the identified group of computing nodes to obtain a set of cordoned nodes and a set of non-cordoned nodes, where cordoning a computing node prevents the computing node from hosting an additional computing pod ⟍ 910

Perform an update for computing pods hosted by the group of computing nodes ⟍ 915

Replace a first set of pods hosted by the set of cordoned nodes with an updated first set of pods that are hosted by the set of non-cordoned nodes, where the updated first set of pods are associated with updated software relative to the replaced first set of pods, and wherein the updated first set of pods are hosted by the set of non-cordoned nodes based on the set of cordoned nodes being prevented, by the cordoning, from hosting the updated first set of pods ⟍ 920

Replace a second set of pods hosted by the set of non-cordoned nodes with an updated second set of pods hosted by the set of non-cordoned nodes, where the updated second set of pods are associated with updated software relative to the replaced second set of pods ⟍ 925

Eliminate, after performing the update, the set of cordoned nodes from the one or more computing clusters ⟍ 935

EFFICIENT DOWNSCALING AND UPDATING OF COMPUTING CLUSTERS

FIELD OF TECHNOLOGY

The present disclosure relates generally to data management, including techniques for efficient downscaling and updating of computing clusters.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 7 through 9 show flowcharts illustrating methods that support efficient downscaling and updating of computing clusters in accordance with aspects of the present disclosure.

DETAILED DESCRIPTION

Figure 1:
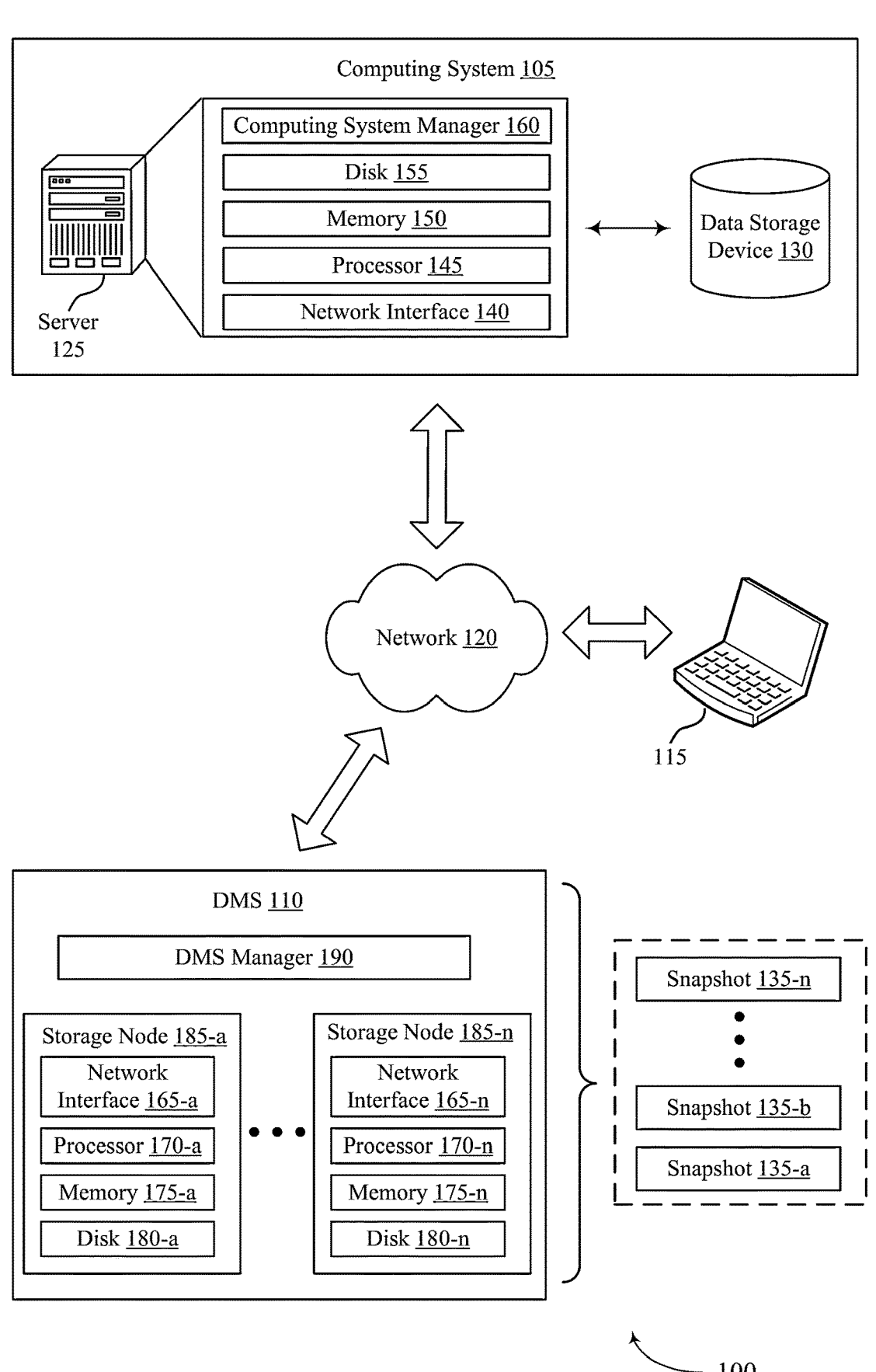
FIG. 1 illustrates an example of a computing environment that supports efficient downscaling and updating of computing clusters in accordance with aspects of the present disclosure.

Some production environments may implement containerized storage to bundle and run applications in the cloud. In some such production environments, containers that host and run the applications may implement various different processes to support automatic scaling and to limit the downtime of nodes in a computing cluster. Some environments, for example, may utilize a Kubernetes framework to run distributed systems, which is an open source platform that supports running different containerized applications and managing large cloud-native workloads. For example, an organization may store data or execute different processes or functions using Kubernetes nodes hosted in the cloud, where each node may host any number of "pods," or individual execution units. In some cases, however, resources (e.g., memory, processing capability, or other resources) on each Kubernetes node may be underutilized. For example, pods may be spread out over multiple nodes rather than consolidated on relatively fewer nodes, which leads to an underutilization of resources on the nodes, and which may lead to excess storage costs and computational inefficiencies.

To address underutilized nodes, some Kubernetes environments support an auto-scaling feature to consolidate underutilized pods onto relatively fewer nodes to better exploit the capabilities of each node. This auto-scaling feature provided by Kubernetes, however, may occur at random times (e.g., times uncontrolled by an owner of the nodes) and may allow for moments of downtime as pods are shut down on one node and brought back up on another node. Such downtime may interrupt ongoing processes occurring on nodes which may increase computing latency and may be disruptive for applications being ran in the computing cluster.

To support a more continuous consolidation process and to limit the amount of disruption that may occur at times where a pod is shut down and brought up on a different node, a computing system may leverage an update (e.g., upgrade) process which implements software or release updates to a pod to also (e.g., simultaneously) consolidate pods on fewer nodes. In a first step, a pre-update process may identify all of the underutilized nodes of a Kubernetes cluster (e.g., all of the nodes that have resource usage amount that is below a given usage threshold). Once the underutilized nodes are identified, the pre-update process cordons off a portion or subset (e.g., 50%, or 50% rounded down to the nearest integer) of all of the underutilized nodes such that the cordoned nodes are "closed off" from accepting any additional pods during a cordoning period. After the nodes are cordoned, the update process is run on the nodes, where all of the existing pods on the nodes are evicted and recycled in favor of a pod with a most current software release. In such cases, the pods on the cordoned nodes may be updated, but since no new nodes can be added to the previously cordoned nodes, the update process may search for a new node (e.g., one of the non-cordoned nodes) to place the updated node (that was previously on the cordoned node as a pod with an outdated release). After the update process, the cordoned nodes have empty pods that are deleted by the existing Kubernetes auto-scaling feature. Accordingly, after the update process, each of the updated pods may be consolidated on the non-cordoned nodes.

In some examples, by combining the updating process with node consolidation, node eviction may be performed at relatively more controlled times. For example, an owner of the nodes may control times in which updates occur (e.g., during non-business hours or times where node usage is at a minimum). In addition, an owner of the nodes may set different cordoning or resource usage thresholds to better control how many nodes and pods are consolidated at a given time.

FIG. 1 illustrates an example of a computing environment 100 that supports efficient downscaling and updating of computing clusters in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some production environments, containerized storage may host and run applications. Some environments, for example, may utilize a Kubernetes framework to run distributed systems. For example, organization may store data or execute different processes or functions using Kubernetes nodes hosted in the cloud, where each node may host any number of "pods," or individual execution units. In some cases, however, resources (e.g., memory, processing capability, or other resources) on each Kubernetes node may be underutilized. For example, pods may be spread out over multiple nodes rather than consolidated on relatively fewer nodes, which leads to an underutilization of resources.

To address underutilized nodes, some Kubernetes environments support an auto-scaling feature to consolidate underutilized pods onto relatively fewer nodes to better exploit the capabilities of each node. This auto-scaling feature provided by Kubernetes, however, may occur at random times and may allow for moments of downtime which may be disruptive for applications being ran in the computing cluster.

To limit the amount of disruption that may occur at times where a computing cluster is being scaled, a computing system such as the DMS 110 may leverage an update (e.g., upgrade) process which implements software or release updates to a pod to also simultaneously consolidate pods on fewer nodes. In a first step, a pre-update process performed by the DMS 110 may identify all of the underutilized nodes of a Kubernetes cluster, and may cordons off a portion or subset (e.g., 50%) of all of the underutilized nodes. After the nodes are cordoned, the update process is run on the nodes, where all of the existing pods on the nodes are evicted and replaced with a pod with a most current software release. In such cases, the pods on the cordoned nodes may be updated, but since no new nodes can be added to the previously cordoned nodes, the update process may search for a new node (e.g., one of the non-cordoned nodes) to place the updated node (that was previously on the cordoned node as a pod with an outdated release). After the update process, the cordoned nodes have empty pods that are deleted by the existing Kubernetes auto-scaling feature.

Figure 2:
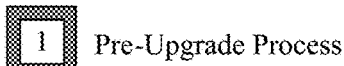
FIG. 2 shows an example of a node downscaling process that supports efficient downscaling and updating of computing clusters in accordance with aspects of the present disclosure.
Figure 2:
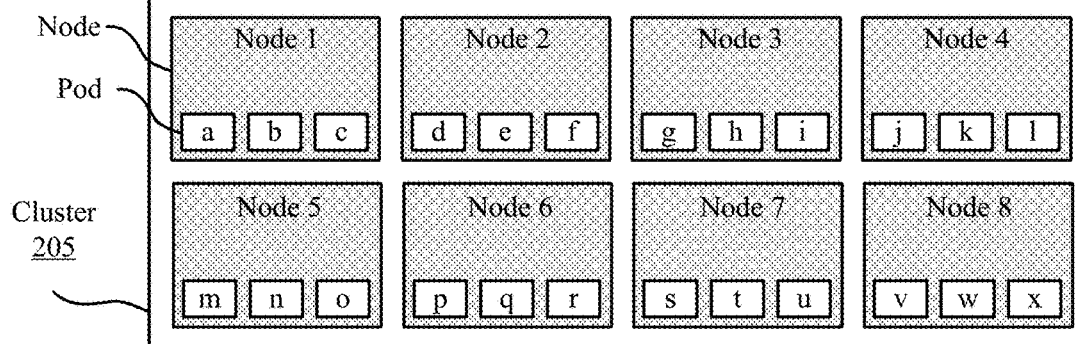
Figure 2:
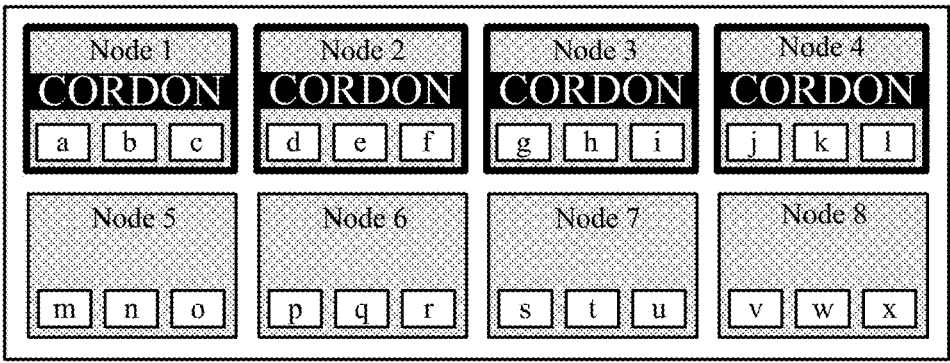
Figure 2:
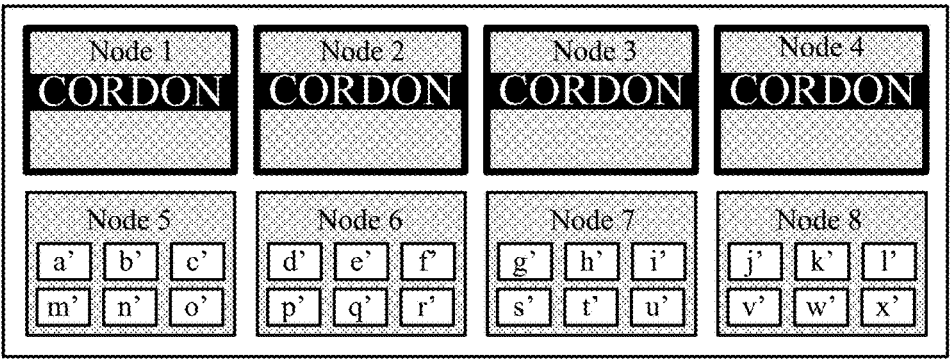
Figure 2:
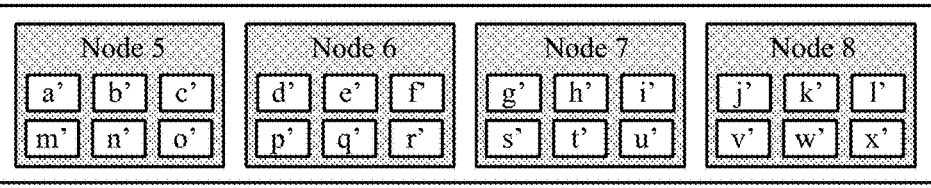

FIG. 2 shows an example of a node downscaling process 200 that supports efficient downscaling and updating of computing clusters in accordance with aspects of the present disclosure. For example, the node downscaling process 200 may occur at a computing cluster such as a Kubernetes cluster that hosts one or more sets of pods (e.g., a group of one or more containers with shared storage and network resources).

Some production environments may implement containerized storage to bundle and run applications in the cloud. In some such production environments, containers that host and run the applications may implement various different processes to support automatic scaling and to limit the downtime of nodes. Some environments, for example, may utilize a Kubernetes framework to run distributed systems, which may provide means for automated system scaling and failover for applications.

Kubernetes is an open source platform that supports running different containerized applications and managing large cloud-native workloads. For example, an organization may store data or execute different processes or functions using Kubernetes nodes hosted in the cloud, where each node may host any number of "pods," or execution units. In some cases, however, resources (e.g., memory, processing capability, or other resources) on each Kubernetes node may be underutilized. For example, pods may be spread out over multiple nodes rather than consolidated on relatively fewer nodes, which leads to an underutilization of resources on the nodes. Since the owner of pods may pay for each cluster utilized on Kubernetes, having an excess of underutilized nodes may be relatively cost-ineffective and may be computationally inefficient.

To address the underutilization of nodes, some Kubernetes environments may support an auto-scaling feature (e.g., adding a "cluster-autoscaler.kubernetes.io safe-to-evict." "true" annotation to a pod) to consolidate underutilized pods onto relatively fewer nodes to better exploit the capabilities of each node. This auto-scaling feature provided by Kubernetes, however, may occur at random times (e.g., times uncontrolled by an owner of the nodes) and at any uncontrolled time, and leads to moments of downtime as pods are shut down on one node and brought back up on another node. This downtime may reduce the overall efficiency of the applications being run on each node, and may lead to disruption for any ongoing operation occurring on pods hosted by the scaled nodes. In addition, the "safe-to-evict" notation provided by Kubernetes serves to flag pods that may be evicted at any time, but lacks flexibility to downscale nodes at times most desirable to an owner of the nodes.

To support a more continuous consolidation process and to limit the amount of disruption that may occur at times where a pod is shut down and brought up on a different node, a computing system may leverage an update (e.g., upgrade) process which implements software or release updates to a pod to also (e.g., simultaneously) consolidate pods on fewer nodes. For example, a computing system may implement a customizable and scalable "safe to evict" process which allows pods to be scaled while simultaneously upgraded with a most current software. In such cases, pods may be scaled at the time of a periodic release upgrade common in SaaS product (rather than during a scaledown operation), which may efficiently upgrade and consolidate the pods in fewer steps of the upgrade.

A Kubernetes cluster may include a quantity of computing nodes. For example, the Kubernetes cluster 205 may include eight individual nodes (e.g., node 1, node 2, node 3, node 4, node 5, node 6, node 7, and node 8), each of which may include respective quantities of pods a-x. Specifically, node 1 may host pods a, b, and c; node 2 may host pods d, e, and f, node 3 may host pods g, h, and i; node 4 may host pods j, k, and l; node 5 may host pods m, n, and o; node 6 may host p, q, and r; node 7 may host pods s, t, and u; and node 8 may host pods v, w, and x.

In a first step (1), a pre-update process may identify all of the underutilized nodes of a Kubernetes cluster 205. For example, the pre-update process may identify all of the nodes that have a central processing unit (CPU) usage amount, a memory usage, a storage usage amount, a quantity of pods that is below a threshold quantity, or any combination thereof, that is below a given usage threshold. In some cases, an owner of the nodes may be able to control the scaling of the pods by setting one or more different memory usage thresholds. During the pre-processing procedure, each of nodes 1-8 may be identified as underutilized. In a second step (2), the pre-update process may perform a cordoning process to cordon off a portion (e.g., 50%) of all of the underutilized nodes such that the cordoned nodes are "closed off" from accepting any additional pods. For example, during the cordoning process, node 1, node 2, node 3, and node 4 may be cordoned such that these nodes may not accept any new pods during an upgrade. The owner of the pods may also set one or more different cordoning thresholds to control the relative quantity of pods that are consolidated onto different nodes.

In a third step (3), after the nodes are cordoned, the update process is run on the nodes. During the update process, all of the existing pods (e.g., pods a-x) on the nodes 1-8 that have an outdated software release are evicted or recycled in favor of a pod with a most current software release. In such cases, pods a-l (hosted by the cordoned nodes) are updated to pods a'-l,' and recycles the old pods a-l. Since nodes 1-4 are cordoned, however, the computing system may not bring up the updated pods a'-l' on pods 1-4. Instead, the computing system may look for un-cordoned nodes in which to place the updated pods a'-l'. For example, the computing system may place updated pods a'-c' on node 5, d'-f' on node 6, g'-i' on node 7, and j'-l' on node 8 (although other combinations of nodes and pods may be possible). In addition, the pods m-x may be updated on nodes 5-8, and since nodes 5-8 are non-cordoned nodes, the computing system may recycle pods m-x in favor of replacing them with nodes m'-x' with the updated software release on node 5-8. During the update process, the pods may be simultaneously updated and consolidated on relatively fewer nodes. For example, the update process may consolidate pods a', b', c', m', n', and o' onto node 5 (where previously pods a, b, c, m, n, and o were hosted on both node 1 and node 5), pods d,'e', f', p', q' and r' onto node 6 (where previously pods d, e, f, p, q, and r were hosted on both node 2 and node 6), pods g', h', i', s', t', and u' onto node 7 (where previously pods g, h, i, s, t, and u were hosted on both node 3 and node 7), and pods j', k', l', v', w', and x' onto node 8 (where previously pods j, k, l, v, w, and x were hosted on both node 4 and node 8). After the update process, the cordoned nodes may be empty.

In a fourth step (4) the empty nodes may be downscaled by an scaling process such as an auto-scaling feature supported by Kubemetes. After the updating and scaling occurs, each of the updated pods may be consolidated on the non-cordoned nodes.

In some implementations of the node-scaling process 200, an owner of the nodes may determine or schedule different time periods in which the scaling and updating of the nodes occurs. For example, since the scaling and updating occurs at times where the existing pods are updated with a latest software release, the owner of the nodes may set the upgrade process to occur during times where network traffic is at a minimum, such as during non-business hours or other off-hours of a day or week. Accordingly, the nodes may stay active during business hours or other critical times. In addition, the owner of the nodes may determine and set a periodicity in which upgrades occur such that the upgrading and consolidating of nodes may occur periodically as controlled by the owner.

Figure 3:
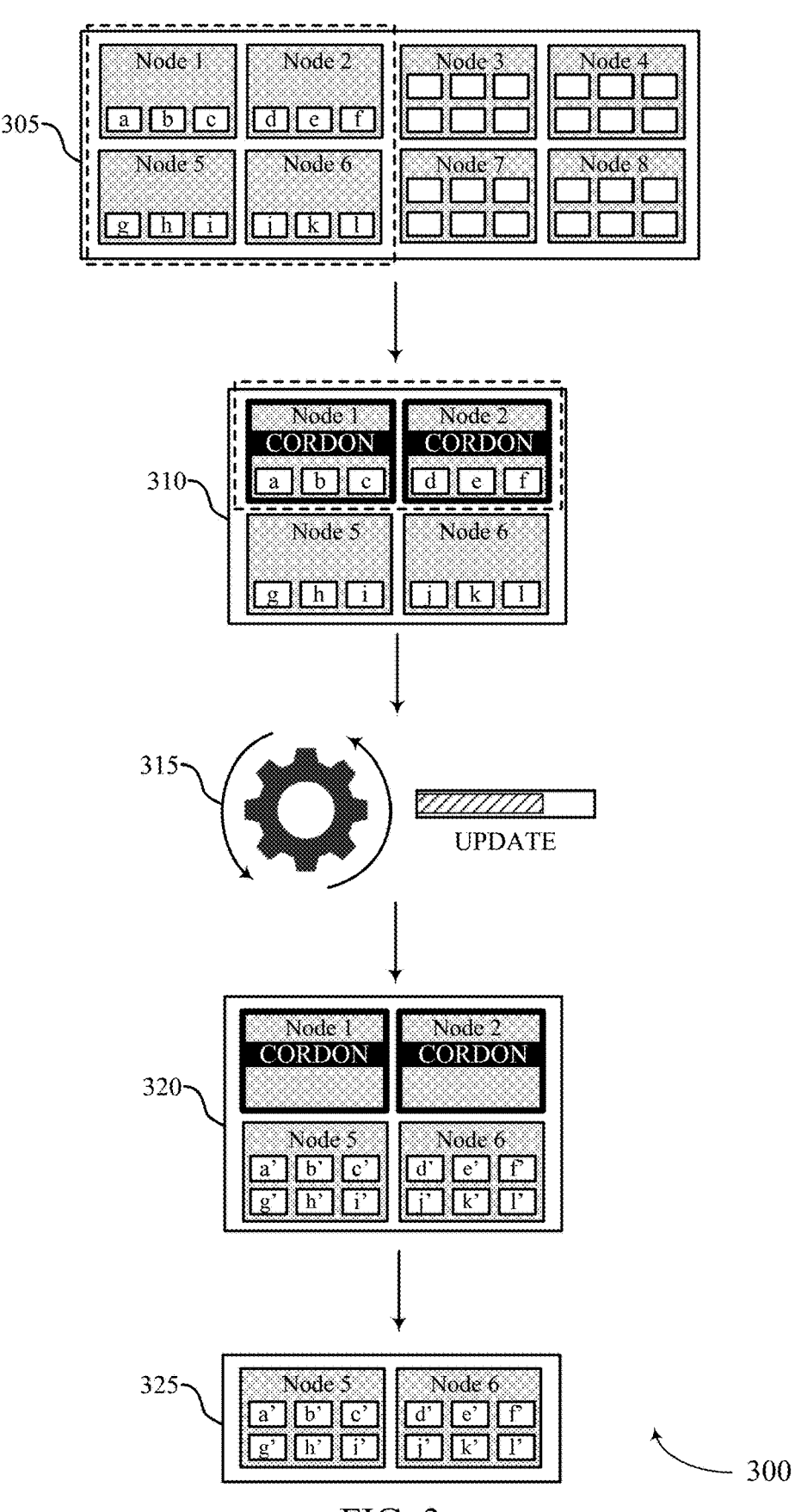
FIG. 3 shows an example of a node downscaling and updating process that supports efficient downscaling and updating of computing clusters in accordance with aspects of the present disclosure.

FIG. 3 shows an example of a node downscaling and updating process 300 that supports efficient downscaling and updating of computing clusters in accordance with aspects of the present disclosure. For example, the node downscaling and updating process 300 may occur at a computing cluster such as a Kubemetes cluster that hosts one or more sets of pods.

At 305, a group of computing clusters or nodes (e.g., nodes 1-8), which host sets of pods (e.g., execution units), may support one or more applications run on the computing clusters. In some examples, a portion of the nodes may be identified that satisfy a resource usage threshold. For example, node 1, node 2, node 5 and node 6 may be identified as having a resource usage that is below the resource usage threshold (e.g., a CPU usage threshold, a memory usage threshold, a storage usage threshold, an ephemeral storage usage threshold or any combination thereof).

At 310, a portion the identified group of computing nodes is cordoned (e.g., to obtain a set of cordoned nodes 1-2 and a set of non-cordoned nodes 5-6). In such examples, the cordoning prevents the computing node from hosting an additional computing pod (e.g., node 1 and node 2 are prevented from hosting any additional pods). In some cases, the identified group of computing nodes may be cordoned according to a cordoning limit, for example, 50 percent (or any other percentage) of the underutilized computing nodes may be cordoned, or a configured maximum number of computing nodes may be set as the cordoning limit. In some cases, an owner of the nodes may control to what extent the computing nodes may scaled by adjusting the resource usage threshold to determine the underutilized nodes, and by capping (or determining a maximum) quantity of nodes that may be cordoned or identified as underutilized at any time.

At 315, an update (e.g., a SaaS product upgrade) may be performed by the computing pods hosted by the computing nodes. In some cases, the update may be performed during one or more times that network activity is below an activity threshold (e.g., non-business hours such as weekends or evening hours, or other non-peak traffic times that avoid system disruption), such that the pods occur active during business hours. Additionally or alternatively, the update may occur periodically according to an update periodicity associated with periodic availability of the updated software or according to a scaling target associated with the one or more computing clusters, or both.

At 320, as part of the update, a first set of pods (e.g., pods a, b, c, d, e, and f) hosted by the set of cordoned nodes (e.g., node 1 and 2) may be evicted and replaced with an updated first set of pods (e.g., pods a', b', c', d', e', and f') on the set of non-cordoned nodes (e.g., nodes 5 and 6). During the update, updated first set of pods are associated with updated software relative to the replaced first set of pods (e.g., pods a', b', c', d', e', and f have an updated software release relative to pods a, b, c, d, e, and f). In addition, the update may replace a second set of pods (e.g., pods g, h, i, j, k, and l) hosted by the set of non-cordoned nodes (e.g., nodes 5 and 6) with an updated second set of pods (e.g., pods g', h', i', j', k', and l') that are also hosted by the set of non-cordoned nodes. Similar to the updated first set of pods, the updated second set of pods are associated with updated software relative to the replaced second set of pods (e.g., pods g', h', i', j', k', and l' have an updated software release relative to pods g, h, i, j, k, and l). After the update occurs, the updated pods a', b', c', g', h', and i' are consolidated on node 5 (leaving cordoned node 1 empty), and the updated pods d', e', f, j', k' and l' are consolidated on node 6 (leaving cordoned node 2 empty).

At 325, the set of cordoned nodes (node 1 and node 2) may be eliminated from the one or more computing clusters. For example, the set of cordoned nodes may be removed via a Kubernetes auto-scaling operation or any other garbage collection or scaling procedure.

Figure 4:
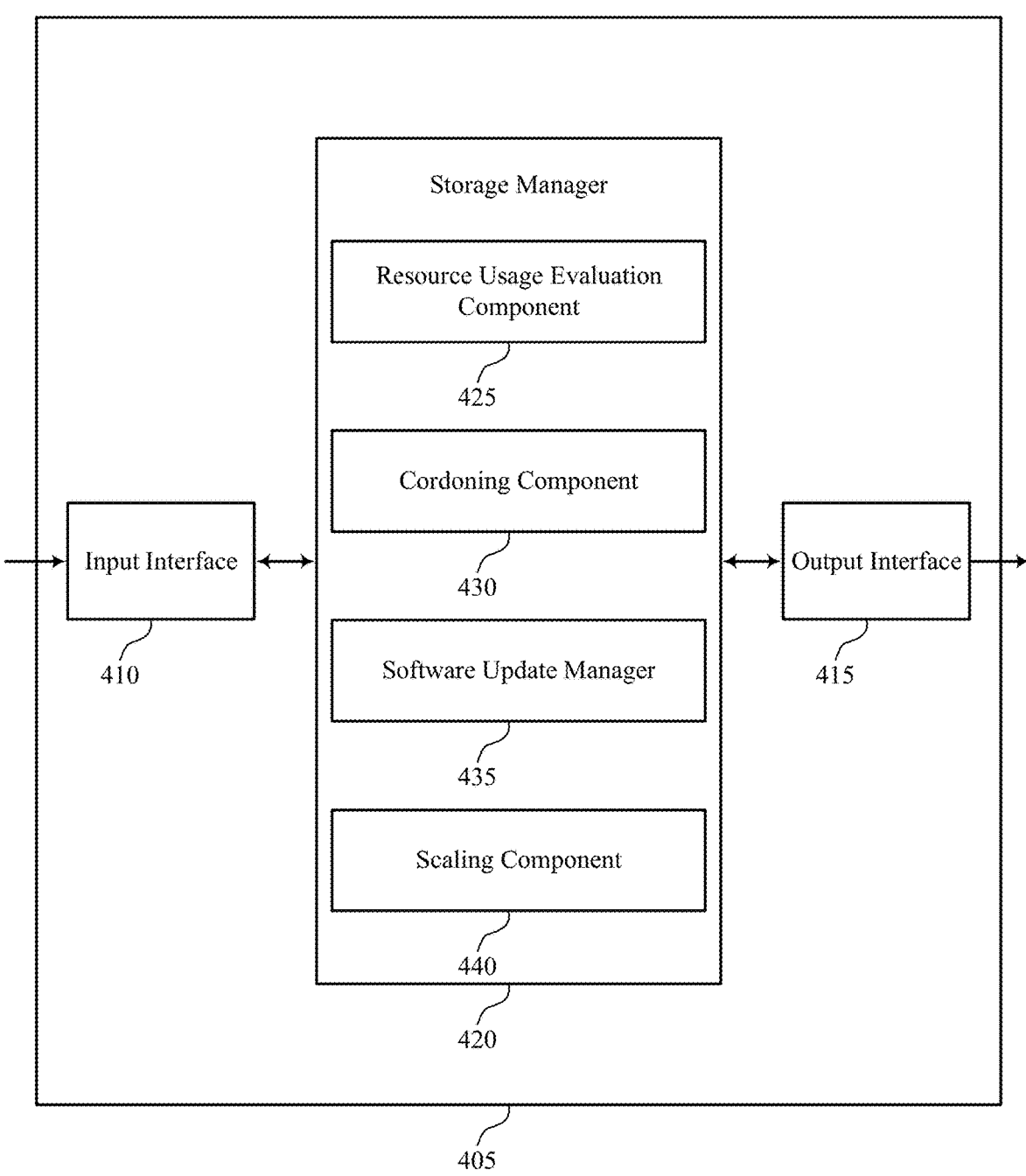
FIG. 4 shows a block diagram of an apparatus that supports efficient downscaling and updating of computing clusters in accordance with aspects of the present disclosure.

FIG. 4 shows a block diagram 400 of a system 405 that supports efficient downscaling and updating of computing clusters in accordance with aspects of the present disclosure. In some examples, the system 405 may be an example of aspects of one or more components described with reference to FIG. 1, such as a DMS 110. The system 405 may include an input interface 410, an output interface 415, and a storage manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the storage manager 420 to support efficient downscaling and updating of computing clusters. In some cases, the input interface 410 may be a component of a network interface 625 as described with reference to FIG. 6.

The output interface 415 may manage output signaling for the system 405. For example, the output interface 415 may receive signaling from other components of the system 405, such as the storage manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the storage manager 420 may include a resource usage evaluation component 425, a cordoning component 430, a software update manager 435, a scaling component 440, or any combination thereof. In some examples, the storage manager 420, or various components thereof, may be configured to perform various operations (e.g., receiving, monitoring, transmitting) using or otherwise in cooperation with the input interface 410, the output interface 415, or both. For example, the storage manager 420 may receive information from the input interface 410, send information to the output interface 415, or be integrated in combination with the input interface 410, the output interface 415, or both to receive information, transmit information, or perform various other operations as described herein.

The storage manager 420 may support managing one or more computing clusters in accordance with examples as disclosed herein. The resource usage evaluation component 425 may be configured as or otherwise support a means for identifying, within the one or more computing clusters, a group of computing nodes that satisfy a resource usage threshold, where computing nodes in the group of computing nodes host respective sets of one or more computing pods. The cordoning component 430 may be configured as or otherwise support a means for cordoning a portion of the identified group of computing nodes to obtain a set of cordoned nodes and a set of non-cordoned nodes, where cordoning a computing node prevents the computing node from hosting an additional computing pod. The software update manager 435 may be configured as or otherwise support a means for performing an update for computing pods hosted by the group of computing nodes. The software update manager 435 may be configured as or otherwise support a means for replacing (e.g., as part of the update) a first set of pods hosted by the set of cordoned nodes with an updated first set of pods that are hosted by the set of non-cordoned nodes, where the updated first set of pods are associated with updated software relative to the replaced first set of pods. The software update manager 435 may be configured as or otherwise support a means for replacing (e.g., as part of the update) a second set of pods hosted by the set of non-cordoned nodes with an updated second set of pods hosted by the set of non-cordoned nodes, where the updated second set of pods are associated with updated software relative to the replaced second set of pods. The scaling component 440 may be configured as or otherwise support a means for eliminating, after performing the update, the set of cordoned nodes from the one or more computing clusters.

Figure 5:
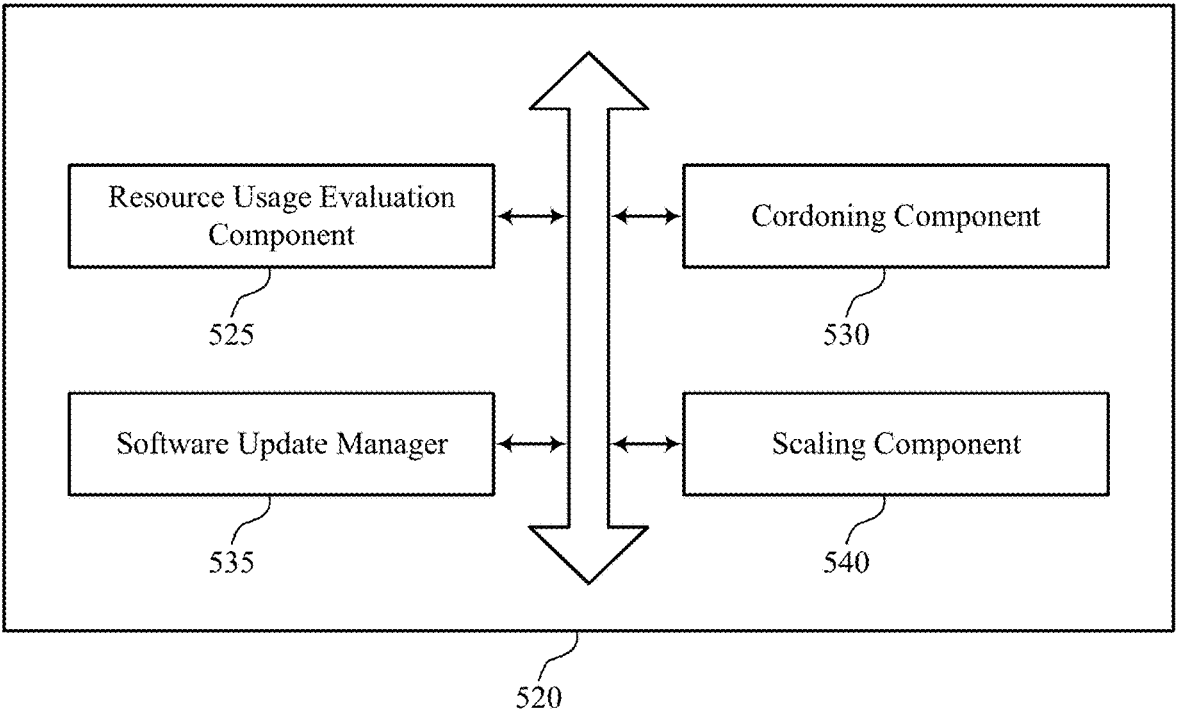
FIG. 5 shows a block diagram of a storage manager that supports efficient downscaling and updating of computing clusters in accordance with aspects of the present disclosure.

FIG. 5 shows a block diagram 500 of a storage manager 520 that supports efficient downscaling and updating of computing clusters in accordance with aspects of the present disclosure. The storage manager 520 may be an example of aspects of a storage manager or a storage manager 420, or both, as described herein. The storage manager 520, or various components thereof, may be an example of means for performing various aspects of efficient downscaling and updating of computing clusters as described herein. For example, the storage manager 520 may include a resource usage evaluation component 525, a cordoning component 530, a software update manager 535, a scaling component 540, or any combination thereof. Each of these components may communicate, directly or indirectly, with one another (e.g., via one or more buses, communications links, communications interfaces, or any combination thereof).

The storage manager 520 may support managing one or more computing clusters in accordance with examples as disclosed herein. The resource usage evaluation component 525 may be configured as or otherwise support a means for identifying, within the one or more computing clusters, a group of computing nodes that satisfy a resource usage threshold, where computing nodes in the group of computing nodes host respective sets of one or more computing pods. The cordoning component 530 may be configured as or otherwise support a means for cordoning a portion of the identified group of computing nodes to obtain a set of cordoned nodes and a set of non-cordoned nodes, where cordoning a computing node prevents the computing node from hosting an additional computing pod. The software update manager 535 may be configured as or otherwise support a means for performing an update for computing pods hosted by the group of computing nodes. In some examples, the software update manager 535 may be configured as or otherwise support a means for replacing (e.g., as part of the update) a first set of pods hosted by the set of cordoned nodes with an updated first set of pods that are hosted by the set of non-cordoned nodes, where the updated first set of pods are associated with updated software relative to the replaced first set of pods. In some examples, the software update manager 535 may be configured as or otherwise support a means for replacing (e.g., as part of the update) a second set of pods hosted by the set of non-cordoned nodes with an updated second set of pods hosted by the set of non-cordoned nodes, where the updated second set of pods are associated with updated software relative to the replaced second set of pods. The scaling component 540 may be configured as or otherwise support a means for eliminating, after performing the update, the set of cordoned nodes from the one or more computing clusters.

In some examples, a quantity of computing nodes included in the set of cordoned nodes is based on a cordoning limit.

In some examples, the cordoning limit is a percentage that is applied to a quantity of computing nodes included in the identified group of computing nodes.

In some examples, the cordoning limit is a maximum quantity of computing nodes that may be included in the set of cordoned nodes.

In some examples, to support cordoning a portion of the identified group of computing nodes, the cordoning component 530 may be configured as or otherwise support a means for cordoning half of the computing nodes that are included in the identified group of computing nodes.

In some examples, to support identifying the group of computing nodes that satisfy the resource usage threshold, the resource usage evaluation component 525 may be configured as or otherwise support a means for identifying computing nodes with respective resource usage levels that are below the resource usage threshold.

In some examples, the resource usage threshold is a central processing unit usage threshold, a memory usage threshold, a storage usage threshold, or any combination thereof.

In some examples, the storage usage threshold is an ephemeral storage usage threshold.

In some examples, to support replacing the first set of pods hosted by the set of cordoned nodes with the updated first set of pods that are hosted by the set of non-cordoned nodes, the software update manager 535 may be configured as or otherwise support a means for hosting the updated first set of pods on (e.g., by) the set of non-cordoned nodes based on the set of cordoned nodes being prevented, by the cordoning, from hosting the updated first set of pods.

In some examples, the updated first set of pods and the updated second set of pods are both hosted by the set of non-cordoned nodes after the update.

In some examples, the cordoned nodes within the set of cordoned nodes are empty after the update is performed for the group of computing nodes.

In some examples, to support eliminating the set of cordoned nodes from the one or more computing clusters, the scaling component 540 may be configured as or otherwise support a means for performing a node-scaling procedure that eliminates the set of cordoned nodes from the one or more computing clusters based on the set of cordoned nodes being empty due to the update.

In some examples, to support performing the update, the software update manager 535 may be configured as or otherwise support a means for performing the update at a time that network activity is below a network activity threshold.

In some examples, to support performing the update, the software update manager 535 may be configured as or otherwise support a means for performing the update based on an update periodicity, where the update periodicity is associated with an availability of the updated software, a scaling target associated with the one or more computing clusters, or both.

In some examples, the update is a SaaS product upgrade process.

Figure 6:
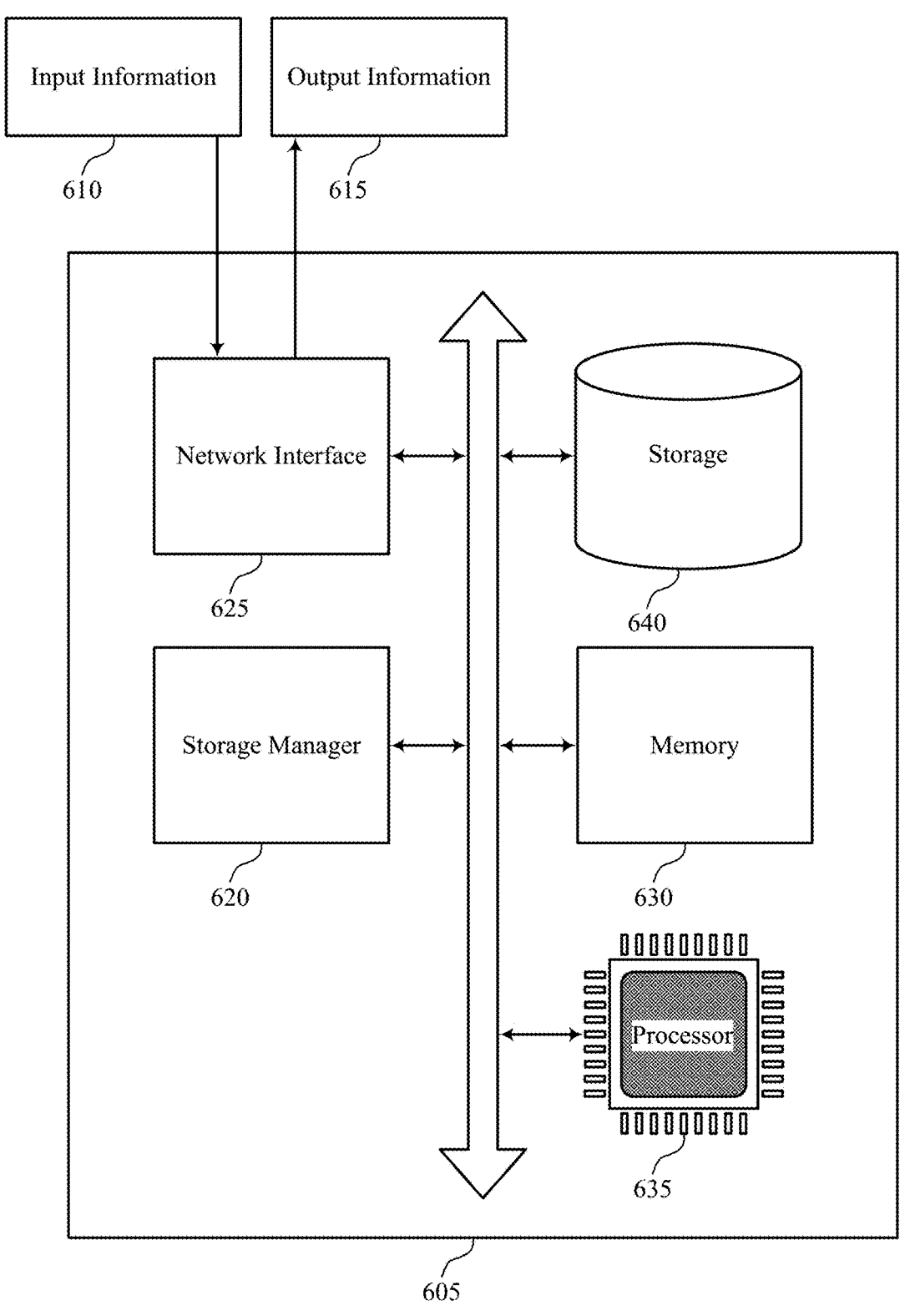
FIG. 6 shows a diagram of a system including a device that supports efficient downscaling and updating of computing clusters in accordance with aspects of the present disclosure.

FIG. 6 shows a block diagram 600 of a system 605 that supports efficient downscaling and updating of computing clusters in accordance with aspects of the present disclosure. The system 605 may be an example of or include the components of a system 405 as described herein. The system 605 may include components for data management, including components such as a storage manager 620, an input information 610, an output information 615, a network interface 625, a memory 630, a processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting efficient downscaling and updating of computing clusters). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

The storage manager 620 may support managing one or more computing clusters in accordance with examples as disclosed herein. For example, the storage manager 620 may be configured as or otherwise support a means for identifying, within the one or more computing clusters, a group of computing nodes that satisfy a resource usage threshold, where computing nodes in the group of computing nodes host respective sets of one or more computing pods. The storage manager 620 may be configured as or otherwise support a means for cordoning a portion of the identified group of computing nodes to obtain a set of cordoned nodes and a set of non-cordoned nodes, where cordoning a computing node prevents the computing node from hosting an additional computing pod. The storage manager 620 may be configured as or otherwise support a means for performing an update for computing pods hosted by the group of computing nodes. The storage manager 620 may be configured as or otherwise support a means for replacing (e.g., as part of the update) a first set of pods hosted by the set of cordoned nodes with an updated first set of pods that are hosted by the set of non-cordoned nodes, where the updated first set of pods are associated with updated software relative to the replaced first set of pods. The storage manager 620 may be configured as or otherwise support a means for replacing (e.g., as part of the update) a second set of pods hosted by the set of non-cordoned nodes with an updated second set of pods hosted by the set of non-cordoned nodes, where the updated second set of pods are associated with updated software relative to the replaced second set of pods. The storage manager 620 may be configured as or otherwise support a means for eliminating, after performing the update, the set of cordoned nodes from the one or more computing clusters.

By including or configuring the storage manager 620 in accordance with examples as described herein, the system 605 may support techniques for efficient downscaling and updating of computing clusters, which may provide one or more benefits such as, for example, reduced latency, reduced storage cost, improved user experience, more efficient utilization of computing resources, network resources, or both, improved scalability, improved security, increased storage efficiency, reduced or eliminated node downtime, increased control of application downtime, improved scalability, among other possibilities.

FIG. 7 shows a flowchart illustrating a method 700 that supports efficient downscaling and updating of computing clusters in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include identifying, within the one or more computing clusters, a group of computing nodes that satisfy a resource usage threshold, where computing nodes in the group of computing nodes host respective sets of one or more computing pods. The operations of block 705 may be performed in accordance with examples as disclosed herein. In some examples, aspects of the operations of 705 may be performed by a resource usage evaluation component 525 as described with reference to FIG. 5.

At 710, the method may include cordoning a portion of the identified group of computing nodes to obtain a set of cordoned nodes and a set of non-cordoned nodes, where cordoning a computing node prevents the computing node from hosting an additional computing pod. The operations of block 710 may be performed in accordance with examples as disclosed herein. In some examples, aspects of the operations of 710 may be performed by a cordoning component 530 as described with reference to FIG. 5.

At 715, the method may include performing an update for computing pods hosted by the group of computing nodes. The operations of block 715 may be performed in accordance with examples as disclosed herein. In some examples, aspects of the operations of 715 may be performed by a software update manager 535 as described with reference to FIG. 5.

In some cases, performing the update for the computing pods may include, at 720, replacing a first set of pods hosted by the set of cordoned nodes with an updated first set of pods that are hosted by the set of non-cordoned nodes, where the updated first set of pods are associated with updated software relative to the replaced first set of pods. The operations of block 720 may be performed in accordance with examples as disclosed herein. In some examples, aspects of the operations of 720 may be performed by a software update manager 535 as described with reference to FIG. 5.

In some cases, performing the update for the computing pods may include, at 725, replacing a second set of pods hosted by the set of non-cordoned nodes with an updated second set of pods hosted by the set of non-cordoned nodes, where the updated second set of pods are associated with updated software relative to the replaced second set of pods. The operations of block 725 may be performed in accordance with examples as disclosed herein. In some examples, aspects of the operations of 725 may be performed by a software update manager 535 as described with reference to FIG. 5.

At 730, the method may include eliminating, after performing the update, the set of cordoned nodes from the one or more computing clusters. The operations of block 730 may be performed in accordance with examples as disclosed herein. In some examples, aspects of the operations of 730 may be performed by a scaling component 540 as described with reference to FIG. 5.

FIG. 8 shows a flowchart illustrating a method 800 that supports efficient downscaling and updating of computing clusters in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include identifying, within the one or more computing clusters, a group of computing nodes that satisfy a resource usage threshold, where computing nodes in the group of computing nodes host respective sets of one or more computing pods. The operations of block 805 may be performed in accordance with examples as disclosed herein. In some examples, aspects of the operations of 805 may be performed by a resource usage evaluation component 525 as described with reference to FIG. 5.

At 810, the method may include cordoning half of the identified group of computing nodes to obtain a set of cordoned nodes and a set of non-cordoned nodes, where cordoning a computing node prevents the computing node from hosting an additional computing pod. The operations of block 810 may be performed in accordance with examples as disclosed herein. In some examples, aspects of the operations of 810 may be performed by a cordoning component 530 as described with reference to FIG. 5.

At 815, the method may include performing an update for computing pods hosted by the group of computing nodes. The operations of block 815 may be performed in accordance with examples as disclosed herein. In some examples, aspects of the operations of 820 may be performed by a software update manager 535 as described with reference to FIG. 5.

In some cases, performing the update for the computing pods may include, at 820, replacing a first set of pods hosted by the set of cordoned nodes with an updated first set of pods that are hosted by the set of non-cordoned nodes, where the updated first set of pods are associated with updated software relative to the replaced first set of pods. The operations of block 820 may be performed in accordance with examples as disclosed herein. In some examples, aspects of the operations of 820 may be performed by a software update manager 535 as described with reference to FIG. 5.

In some cases, performing the update for the computing pods may include, at 825, replacing a second set of pods hosted by the set of non-cordoned nodes with an updated second set of pods hosted by the set of non-cordoned nodes, where the updated second set of pods are associated with updated software relative to the replaced second set of pods. The operations of block 825 may be performed in accordance with examples as disclosed herein. In some examples, aspects of the operations of 825 may be performed by a software update manager 535 as described with reference to FIG. 5.

At 835, the method may include eliminating, after performing the update, the set of cordoned nodes from the one or more computing clusters. The operations of block 835 may be performed in accordance with examples as disclosed herein. In some examples, aspects of the operations of 835 may be performed by a scaling component 540 as described with reference to FIG. 5.

FIG. 9 shows a flowchart illustrating a method 900 that supports efficient downscaling and updating of computing clusters in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include identifying, within the one or more computing clusters, a group of computing nodes that satisfy a resource usage threshold, where computing nodes in the group of computing nodes host respective sets of one or more computing pods. The operations of block 905 may be performed in accordance with examples as disclosed herein. In some examples, aspects of the operations of 905 may be performed by a resource usage evaluation component 525 as described with reference to FIG. 5.

At 910, the method may include cordoning a portion of the identified group of computing nodes to obtain a set of cordoned nodes and a set of non-cordoned nodes, where cordoning a computing node prevents the computing node from hosting an additional computing pod. The operations of block 910 may be performed in accordance with examples as disclosed herein. In some examples, aspects of the operations of 910 may be performed by a cordoning component 530 as described with reference to FIG. 5.

At 915, the method may include performing an update for computing pods hosted by the group of computing nodes. The operations of block 915 may be performed in accordance with examples as disclosed herein. In some examples, aspects of the operations of 915 may be performed by a software update manager 535 as described with reference to FIG. 5.

In some cases, performing the update for the computing pods may include, at 920, replacing a first set of pods hosted by the set of cordoned nodes with an updated first set of pods that are hosted by the set of non-cordoned nodes, where the updated first set of pods are associated with updated software relative to the replaced first set of pods, and where the updated first set of pods are hosted by the set of non-cordoned nodes based on the set of cordoned nodes being prevented, by the cordoning, from hosting the updated first set of pods. The operations of block 920 may be performed in accordance with examples as disclosed herein. In some examples, aspects of the operations of 920 may be performed by a software update manager 535 as described with reference to FIG. 5.

In some cases, performing the update for the computing pods may include, at 925, replacing a second set of pods hosted by the set of non-cordoned nodes with an updated second set of pods hosted by the set of non-cordoned nodes, where the updated second set of pods are associated with updated software relative to the replaced second set of pods. The operations of block 925 may be performed in accordance with examples as disclosed herein. In some examples, aspects of the operations of 925 may be performed by a software update manager 535 as described with reference to FIG. 5.

At 930, the method may include eliminating, after performing the update, the set of cordoned nodes from the one or more computing clusters. The operations of block 930 may be performed in accordance with examples as disclosed herein. In some examples, aspects of the operations of 930 may be performed by a scaling component 540 as described with reference to FIG. 5.

A method for managing one or more computing clusters is described. The method may include identifying, within the one or more computing clusters, a group of computing nodes that satisfy a resource usage threshold, where computing nodes in the group of computing nodes host respective sets of one or more computing pods, cordoning a portion of the identified group of computing nodes to obtain a set of cordoned nodes and a set of non-cordoned nodes, where cordoning a computing node prevents the computing node from hosting an additional computing pod, performing an update for computing pods hosted by the group of computing nodes, where performing the update includes replacing a first set of pods hosted by the set of cordoned nodes with an updated first set of pods that are hosted by the set of non-cordoned nodes, where the updated first set of pods are associated with updated software relative to the replaced first set of pods, and replacing a second set of pods hosted by the set of non-cordoned nodes with an updated second set of pods hosted by the set of non-cordoned nodes, where the updated second set of pods are associated with updated software relative to the replaced second set of pods, and eliminating, after performing the update, the set of cordoned nodes from the one or more computing clusters.

An apparatus for managing one or more computing clusters is described. The apparatus may include a processor, memory coupled with the processor, and instructions stored in the memory. The instructions may be executable by the processor to cause the apparatus to identify, within the one or more computing clusters, a group of computing nodes that satisfy a resource usage threshold, where computing nodes in the group of computing nodes host respective sets of one or more computing pods, cordon a portion of the identified group of computing nodes to obtain a set of cordoned nodes and a set of non-cordoned nodes, where cordoning a computing node prevents the computing node from hosting an additional computing pod, perform an update for computing pods hosted by the group of computing nodes, where performing the update includes replacing a first set of pods hosted by the set of cordoned nodes with an updated first set of pods that are hosted by the set of non-cordoned nodes, where the updated first set of pods are associated with updated software relative to the replaced first set of pods, and replacing a second set of pods hosted by the set of non-cordoned nodes with an updated second set of pods hosted by the set of non-cordoned nodes, where the updated second set of pods are associated with updated software relative to the replaced second set of pods, and eliminate, after performing the update, the set of cordoned nodes from the one or more computing clusters.

Another apparatus for managing one or more computing clusters is described. The apparatus may include means for identifying, within the one or more computing clusters, a group of computing nodes that satisfy a resource usage threshold, where computing nodes in the group of computing nodes host respective sets of one or more computing pods, means for cordoning a portion of the identified group of computing nodes to obtain a set of cordoned nodes and a set of non-cordoned nodes, where cordoning a computing node prevents the computing node from hosting an additional computing pod, means for performing an update for computing pods hosted by the group of computing nodes, where performing the update includes replacing a first set of pods hosted by the set of cordoned nodes with an updated first set of pods that are hosted by the set of non-cordoned nodes, where the updated first set of pods are associated with updated software relative to the replaced first set of pods, and replacing a second set of pods hosted by the set of non-cordoned nodes with an updated second set of pods hosted by the set of non-cordoned nodes, where the updated second set of pods are associated with updated software relative to the replaced second set of pods, and means for eliminating, after performing the update, the set of cordoned nodes from the one or more computing clusters.

A non-transitory computer-readable medium storing code for managing one or more computing clusters is described. The code may include instructions executable by a processor to identify, within the one or more computing clusters, a group of computing nodes that satisfy a resource usage threshold, where computing nodes in the group of computing nodes host respective sets of one or more computing pods, cordon a portion of the identified group of computing nodes to obtain a set of cordoned nodes and a set of non-cordoned nodes, where cordoning a computing node prevents the computing node from hosting an additional computing pod, perform an update for computing pods hosted by the group of computing nodes, where performing the update includes replacing a first set of pods hosted by the set of cordoned nodes with an updated first set of pods that are hosted by the set of non-cordoned nodes, where the updated first set of pods are associated with updated software relative to the replaced first set of pods, and replacing a second set of pods hosted by the set of non-cordoned nodes with an updated second set of pods hosted by the set of non-cordoned nodes, where the updated second set of pods are associated with updated software relative to the replaced second set of pods, and eliminate, after performing the update, the set of cordoned nodes from the one or more computing clusters.

In some examples of the method, apparatuses, and non-transitory computer-readable medium described herein, a quantity of computing nodes included in the set of cordoned nodes may be based on a cordoning limit.

In some examples of the method, apparatuses, and non-transitory computer-readable medium described herein, the cordoning limit is a percentage that may be applied to a quantity of computing nodes included in the identified group of computing nodes.

In some examples of the method, apparatuses, and non-transitory computer-readable medium described herein, the cordoning limit is a maximum quantity of computing nodes that may be included in the set of cordoned nodes.

In some examples of the method, apparatuses, and non-transitory computer-readable medium described herein, operations, features, means, or instructions for cordoning a portion of the identified group of computing nodes may include operations, features, means, or instructions for cordoning half of the computing nodes that may be included in the identified group of computing nodes.

In some examples of the method, apparatuses, and non-transitory computer-readable medium described herein, operations, features, means, or instructions for identifying the group of computing nodes that satisfy the resource usage threshold may include operations, features, means, or instructions for identifying computing nodes with respective resource usage levels that may be below the resource usage threshold.

In some examples of the method, apparatuses, and non-transitory computer-readable medium described herein, the resource usage threshold is a central processing unit usage threshold, a memory usage threshold, a storage usage threshold, or any combination thereof.

In some examples of the method, apparatuses, and non-transitory computer-readable medium described herein, the storage usage threshold is an ephemeral storage usage threshold.

In some examples of the method, apparatuses, and non-transitory computer-readable medium described herein, operations, features, means, or instructions for replacing the first set of pods hosted by the set of cordoned nodes with the updated first set of pods that may be hosted by the set of non-cordoned nodes may include operations, features, means, or instructions for hosting the updated first set of pods on (e.g., by) the set of non-cordoned nodes based on the set of cordoned nodes being prevented, by the cordoning, from hosting the updated first set of pods.

In some examples of the method, apparatuses, and non-transitory computer-readable medium described herein, the updated first set of pods and the updated second set of pods may be both hosted by the set of non-cordoned nodes after the update.

In some examples of the method, apparatuses, and non-transitory computer-readable medium described herein, operations, features, means, or instructions for eliminating the set of cordoned nodes from the one or more computing clusters may include operations, features, means, or instructions for performing a node-scaling procedure that eliminates the set of cordoned nodes from the one or more computing clusters based on the set of cordoned nodes being empty due to the update.

In some examples of the method, apparatuses, and non-transitory computer-readable medium described herein, the cordoned nodes within the set of cordoned nodes may be empty after the update may be performed for the group of computing nodes.

In some examples of the method, apparatuses, and non-transitory computer-readable medium described herein, operations, features, means, or instructions for performing the update may include operations, features, means, or instructions for performing the update at a time that network activity may be below a network activity threshold.

In some examples of the method, apparatuses, and non-transitory computer-readable medium described herein, operations, features, means, or instructions for performing the update may include operations, features, means, or instructions for performing the update based on an update periodicity, where the update periodicity may be associated with an availability of the updated software, a scaling target associated with the one or more computing clusters, or both.

In some examples of the method, apparatuses, and non-transitory computer-readable medium described herein, the update is a SaaS product upgrade process.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

identifying, within one or more computing clusters, a group of computing nodes having respective resource usage levels that are below a resource usage threshold, wherein computing nodes in the group of computing nodes host respective sets of one or more computing pods;

cordoning a portion of the identified group of computing nodes having the respective resource usage levels that are below the resource usage threshold to obtain a set of cordoned nodes and a set of non-cordoned nodes, wherein cordoning a computing node prevents the computing node from hosting an additional computing pod;

performing an update for computing pods hosted by the group of computing nodes, wherein performing the update comprises:

replacing a first set of pods originally hosted by the set of cordoned nodes with an updated first set of pods that are newly hosted by the set of non-cordoned nodes, wherein the updated first set of pods are associated with updated software relative to the replaced first set of pods; and replacing a second set of pods hosted by the set of non-cordoned nodes with an updated second set of pods hosted by the set of non-cordoned nodes, wherein the updated second set of pods are associated with updated software relative to the replaced second set of pods; and eliminating, after performing the update, the set of cordoned nodes from the one or more computing clusters.

2. The method of claim 1, wherein a quantity of computing nodes included in the set of cordoned nodes is based at least in part on a cordoning limit.

3. The method of claim 2, wherein the cordoning limit comprises a percentage that is applied to a quantity of computing nodes included in the identified group of computing nodes.

4. The method of claim 2, wherein the cordoning limit comprises a maximum quantity of computing nodes that may be included in the set of cordoned nodes.

5. The method of claim 1, wherein cordoning the portion of the identified group of computing nodes comprises:

cordoning half of the computing nodes that are included in the identified group of computing nodes.

6. The method of claim 1, wherein the resource usage threshold comprises a central processing unit usage threshold, a memory usage threshold, a storage usage threshold, or any combination thereof.

7. The method of claim 6, wherein the storage usage threshold comprises an ephemeral storage usage threshold.

8. The method of claim 1, wherein replacing the first set of pods hosted by the set of cordoned nodes with the updated first set of pods that are hosted by the set of non-cordoned nodes comprises:

hosting the updated first set of pods on the set of non-cordoned nodes based at least in part on the set of cordoned nodes being prevented, by the cordoning, from hosting the updated first set of pods.

9. The method of claim 1, wherein the updated first set of pods and the updated second set of pods are both hosted by the set of non-cordoned nodes after the update.

10. The method of claim 9, wherein eliminating the set of cordoned nodes from the one or more computing clusters comprises:

performing a node-scaling procedure that eliminates the set of cordoned nodes from the one or more computing clusters based at least in part on the set of cordoned nodes being empty due to the update.

11. The method of claim 1, wherein cordoned nodes within the set of cordoned nodes are empty after the update is performed for the group of computing nodes.

12. The method of claim 1, wherein performing the update comprises:

performing the update at a time that network activity is below a network activity threshold.

13. The method of claim 1, wherein performing the update comprises:

performing the update based at least in part on an update periodicity, wherein the update periodicity is associated with an availability of the updated software, a scaling target associated with the one or more computing clusters, or both.

14. The method of claim 1, wherein the update comprises a Software-as-a-Service (SaaS) product upgrade process.

15. An apparatus, comprising:

at least one processor;

at least one memory coupled with the at least one processor; and instructions stored in the at least one memory and executable by the at least one processor to cause the apparatus to:

identify, within one or more computing clusters, a group of computing nodes having respective resource usage levels that are below a resource usage threshold, wherein computing nodes in the group of computing nodes host respective sets of one or more computing pods;

cordon a portion of the identified group of computing nodes having the respective resource usage levels that are below the resource usage threshold to obtain a set of cordoned nodes and a set of non-cordoned nodes, wherein cordoning a computing node prevents the computing node from hosting an additional computing pod;

perform an update for computing pods hosted by the group of computing nodes, wherein, to perform the update, the instructions are executable by the at least one processor to cause the apparatus to:

replace a first set of pods originally hosted by the set of cordoned nodes with an updated first set of pods that are newly hosted by the set of non-cordoned nodes, wherein the updated first set of pods are associated with updated software relative to the replaced first set of pods; and replace a second set of pods hosted by the set of non-cordoned nodes with an updated second set of pods hosted by the set of non-cordoned nodes, wherein the updated second set of pods are associated with updated software relative to the replaced second set of pods; and eliminate, after performing the update, the set of cordoned nodes from the one or more computing clusters.

16. The apparatus of claim 15, wherein a quantity of computing nodes included in the set of cordoned nodes is based at least in part on a cordoning limit.

17. The apparatus of claim 16, wherein the cordoning limit comprises a percentage that is applied to a quantity of computing nodes included in the identified group of computing nodes.

18. The apparatus of claim 16, wherein the cordoning limit comprises a maximum quantity of computing nodes that may be included in the set of cordoned nodes.

19. A non-transitory computer-readable medium storing code, the code comprising instructions executable by at least one processor to:

identify, within one or more computing clusters, a group of computing nodes having respective resource usage levels that are below a resource usage threshold, wherein computing nodes in the group of computing nodes host respective sets of one or more computing pods;

cordon a portion of the identified group of computing nodes having the respective resource usage levels that are below the resource usage threshold to obtain a set of cordoned nodes and a set of non-cordoned nodes, wherein cordoning a computing node prevents the computing node from hosting an additional computing pod;

perform an update for computing pods hosted by the group of computing nodes, wherein, to perform the update, the instructions are executable by the at least one processor to:

replace a first set of pods originally hosted by the set of cordoned nodes with an updated first set of pods that are newly hosted by the set of non-cordoned nodes, wherein the updated first set of pods are associated with updated software relative to the replaced first set of pods; and replace a second set of pods hosted by the set of non-cordoned nodes with an updated second set of pods hosted by the set of non-cordoned nodes, wherein the updated second set of pods are associated with updated software relative to the replaced second set of pods; and eliminate, after performing the update, the set of cordoned nodes from the one or more computing clusters.

* * * * *